United States Patent

Di Bernardo et al.

[11] Patent Number: 5,817,935
[45] Date of Patent: Oct. 6, 1998

[54] APPARATUS FOR TESTING A WHEEL PASSING OVER AN OBSTACLE

[75] Inventors: Carlo Di Bernardo; Federico Mancosu, both of Milan; Giuseppe Matrascia, Seregno, all of Italy

[73] Assignee: Pirelli Coordinamento Pneuatici S.P.A., Milan, Italy

[21] Appl. No.: 752,381

[22] Filed: Nov. 20, 1996

[30] Foreign Application Priority Data

Nov. 21, 1995 [IT] Italy .................................. MI95A2401

[51] Int. Cl.⁶ .................................................. G01M 17/02
[52] U.S. Cl. ............................................................ 73/146
[58] Field of Search ..................................... 73/8, 9, 146

[56] References Cited

U.S. PATENT DOCUMENTS 3,599,486  8/1971  Pernau et al. .
5,003,819  4/1991  Koopmann .

FOREIGN PATENT DOCUMENTS 2742110  3/1979  Germany ................................. 73/146
2831978  2/1980  Germany ................................. 73/146
3040252  10/1982  Germany .
2225437  5/1990  United Kingdom .

OTHER PUBLICATIONS

P.W.A. Zegelaar et a, "Tyre Models for the Study of In–Plane Dynamics" The Dynamics of Vehicle on Roads and on Tracks, Supplement to Vehicle System Dynamics, vol. 23, pp. 578–590 (1994), (no month).

Primary Examiner—William L. Oen
Attorney, Agent, or Firm—Watson Cole Stevens Davis, P.L.L.C.

[57] ABSTRACT

An apparatus for testing a test wheel, provided with a tire and a rim, by passing the wheel over an obstacle. The apparatus including a road-wheel, a steering knuckle capable of rotatably supporting a hub and the test wheel, and two suspension arms supporting the steering knuckle. The apparatus also comprises a first, second, third and fourth leaf spring connected to the suspension arms and to a supporting frame, a fifth leaf spring connected to the steering knuckle and to the supporting frame, and a pneumatic spring in engagement with the steering knuckle and with the supporting frame. First and second acceleration transducers associated with the hub provide measurements of natural frequencies and dampenings of the tire in a radial and in a longitudinal direction. The apparatus can be used both in a movable-hub mode and in a fixed-hub mode.

14 Claims, 4 Drawing Sheets

APPARATUS FOR TESTING A WHEEL PASSING OVER AN OBSTACLE

FIELD OF THE INVENTION

The present invention relates to an apparatus for a test of passing over an obstacle of a wheel comprising a rim and a tire.

BACKGROUND OF THE DESCRIPTION

A test used to determine the characteristics of a tire is that of passing over an obstacle. Such test is used to detect natural frequencies and dampenings of a tire in a vertical direction and in a horizontal direction, that is to say in the plane of the wheel.

To this day, the used test of passing over an obstacle used is of the indoor type, with a fixed hub on a road wheel. The tests consists in mounting the wheel on a dynamometric hub and squeezing it, with an imposed vertical load, against a road-wheel rotating at preselected speeds having a relief of a preselected shape that constitutes the obstacle.

The excitation to which the tire is subjected, in the fixed-hub test, is the deformation imposed by the obstacle when the tire passes over it at a certain speed. The obstacle, in relation to the forward speed of the wheel, excites the natural motions of the tire (excitation of the impulsive type), that starts to vibrate with its natural frequencies. After a more or less short time these vibrations are dampened. The methodology consists, then, in the analysis of the free dampened oscillations of the tire at different forward speeds. The signals variable over time, detected at the fixed hub, are those of the longitudinal and vertical force, that are depending on the excitation provided by the obstacle, on the forward speed of the wheel and on the natural frequencies of the tire in the plane of the wheel.

Four natural modes of the tire, known as "rigid" modes, are highlighted by the fixed-hub test of passing over an obstacle. During the test the signals of force, longitudinal and vertical, after the obstacle has abandoned the tire are analyzed over time, and the natural frequencies and the dampenings are identified with techniques of analysis or mathematical models (for example the Prony or Ibrahim model) for signals of the impulsive type. The final results are the curves of the natural frequencies and of the dampenings of the four vibration modes of the tire (that is, those modes ranging from 30 Hz to 130 Hz) against the forward speed. Thus, overall, eight experimental curves are obtained against the speed: four of the natural frequencies and four of the dampenings.

In the traditional test of passing over an obstacle, the condition of constraint of the wheel of the fixed hub (equivalent to a hinge in the plane of the wheel) does not allow the highlighting of the natural modes of the wheel wherein the hub is free to oscillate in the vertical and longitudinal direction. Such natural modes, on the other hand, are present in a motor car under 30 Hz ($\approx$14 Hz in a vertical direction, $\approx$20 Hz in the longitudinal direction).

SUMMARY OF THE INVENTION

The object of the present invention is an apparatus that allows the analysis of the natural modes of a tire in a range of frequencies from 0 Hz to 130 Hz.

The above mentioned object is achieved, according to the invention, with an apparatus for a test of passing over an obstacle of a wheel comprising a rim and a tire, said apparatus being usable under the condition of movable hub and comprising a road-wheel rotating at preselected speeds, supporting a relief with a preselected shape forming said obstacle, a hub to which said rim of said wheel is fastened, a steering knuckle capable of rotatably supporting said hub and said wheel, first and second acceleration transducer means associated with said hub capable of measuring natural frequencies and dampenings of said tire in a radial and in a longitudinal direction, characterized in that it comprises two suspension arms supporting said steering knuckle, a first, second, third and fourth leaf spring having respective first ends fastened to a respective suspension arm and respective second ends connected to a supporting frame by means of respective adjustable first, second, third and fourth fastening means capable of varying the length of each leaf spring to adjust its stiffness and to change the longitudinal stiffness of said suspension arms, a fifth leaf spring having a first end fastened to said steering knuckle and a second end connected to a shoe by means of fifth adjustable fastening means capable of varying the length of said fifth leaf spring to adjust its stiffness and to change the radial stiffness of said suspension arms, and a pneumatic spring in engagement with said steering knuckle and with said supporting frame, said pneumatic spring being capable of giving an initial radial preload to said tire, said preload being equivalent to a share of weight of a vehicle that bears upon a wheel.

According to a preferred embodiment, said apparatus comprises clamping elements capable of being engaged with said first ends of said first, second, third and fourth leaf springs to clamp said suspension arms in a longitudinal direction, said fifth leaf spring being shortenable so as to clamp said suspension arms in a radial direction so as to attain a condition of fixed hub.

The apparatus according to the invention acts like a "passive suspension" and simulates the behavior of the suspension of a vehicle, wherein the excitation at the hub of the wheel is given by an obstacle placed on the road wheel, that transmits the forces to the hub through the tire. In the apparatus it is possible to adjust the stiffness of the suspension in a vertical and longitudinal direction, and thus the two values of the natural frequencies of the suspension (radial and longitudinal) by varying the stiffness of the leaf springs through displacements of the point at which the leaf springs engage the supporting frame so that the frequencies of the unsuspended masses of the "simulator" (passive suspension) coincide with those of the vehicle under examination. Thus, the apparatus allows to have values of the frequencies of the suspension equal to those of the vehicle under examination (of which the comfort is to be optimized).

While with the traditional test of passing over an obstacle performed with the condition of constraint of the fixed-hub wheel four natural modes of the tire are highlighted, called "rigid" modes, with the test with a hub that is movable, in a longitudinal and a radial direction, it is possible to highlight two more natural modes, one in a radial direction, the other in a longitudinal one, that are those so-called of "suspension", that fall in the frequency interval of 0–30 Hz.

From the movable-hub test of passing over an obstacle are thus obtained six natural modes of the tire, that translate into six curves of the natural frequencies and of the corresponding dampenings against the forward speed.

BRIEF DESCRIPTION OF THE DRAWINGS

Features and advantages of the invention will now be illustrated with reference to an embodiment represented as a non-limiting example in the enclosed drawings, wherein.

DETAILED DESCRIPTION OF THE PREFERRED EMBODIMENTS

Figure 1:
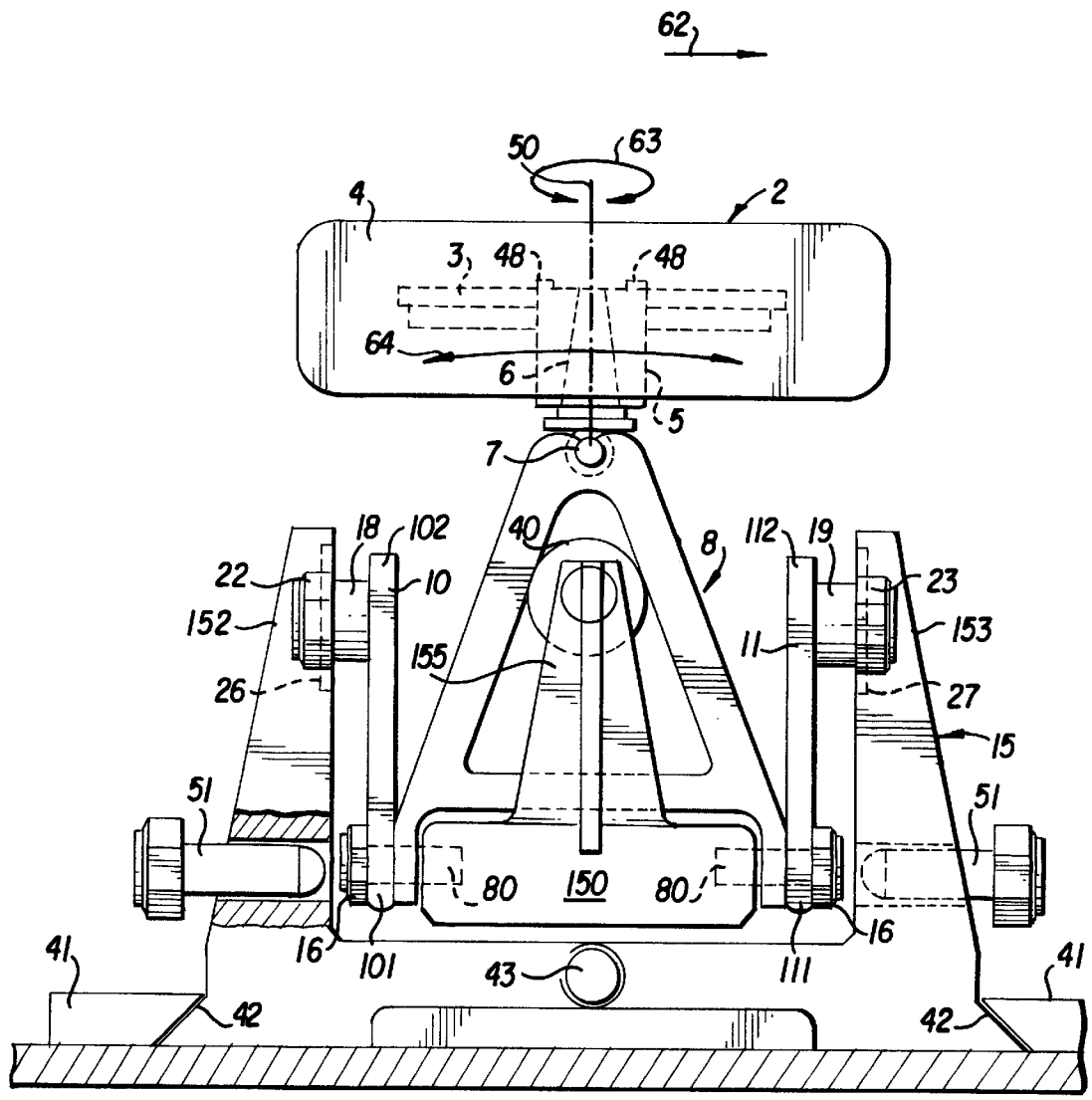
FIG. 1 is a front view of an apparatus for a test of passing a tire over an obstacle of a w/road-wheel, without showing the road wheel of the apparatus, made according to the invention.
Figure 2:
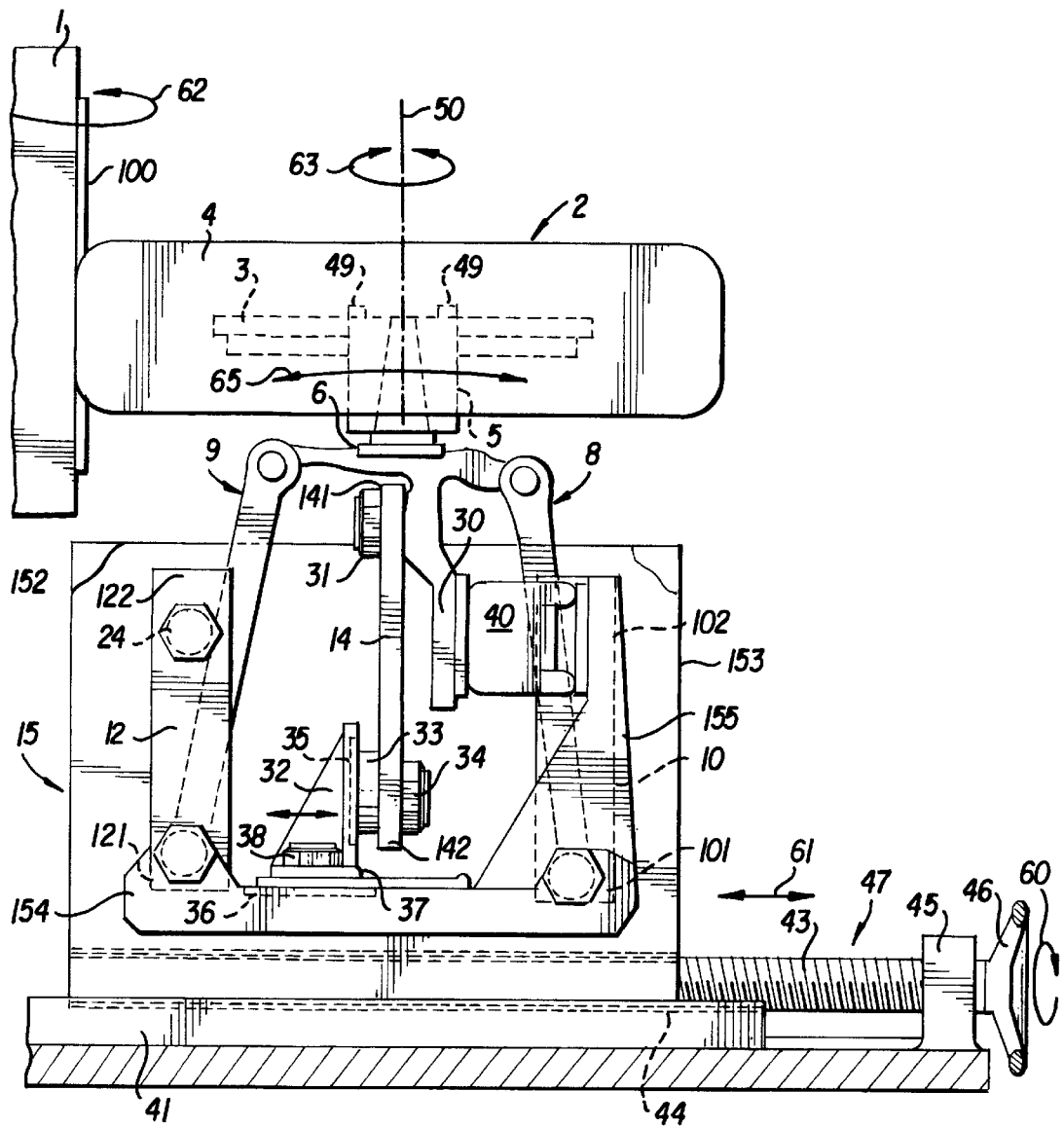
FIG. 2 is a side view of the apparatus of FIG. 1, but also showing the road-wheel.
Figure 3:
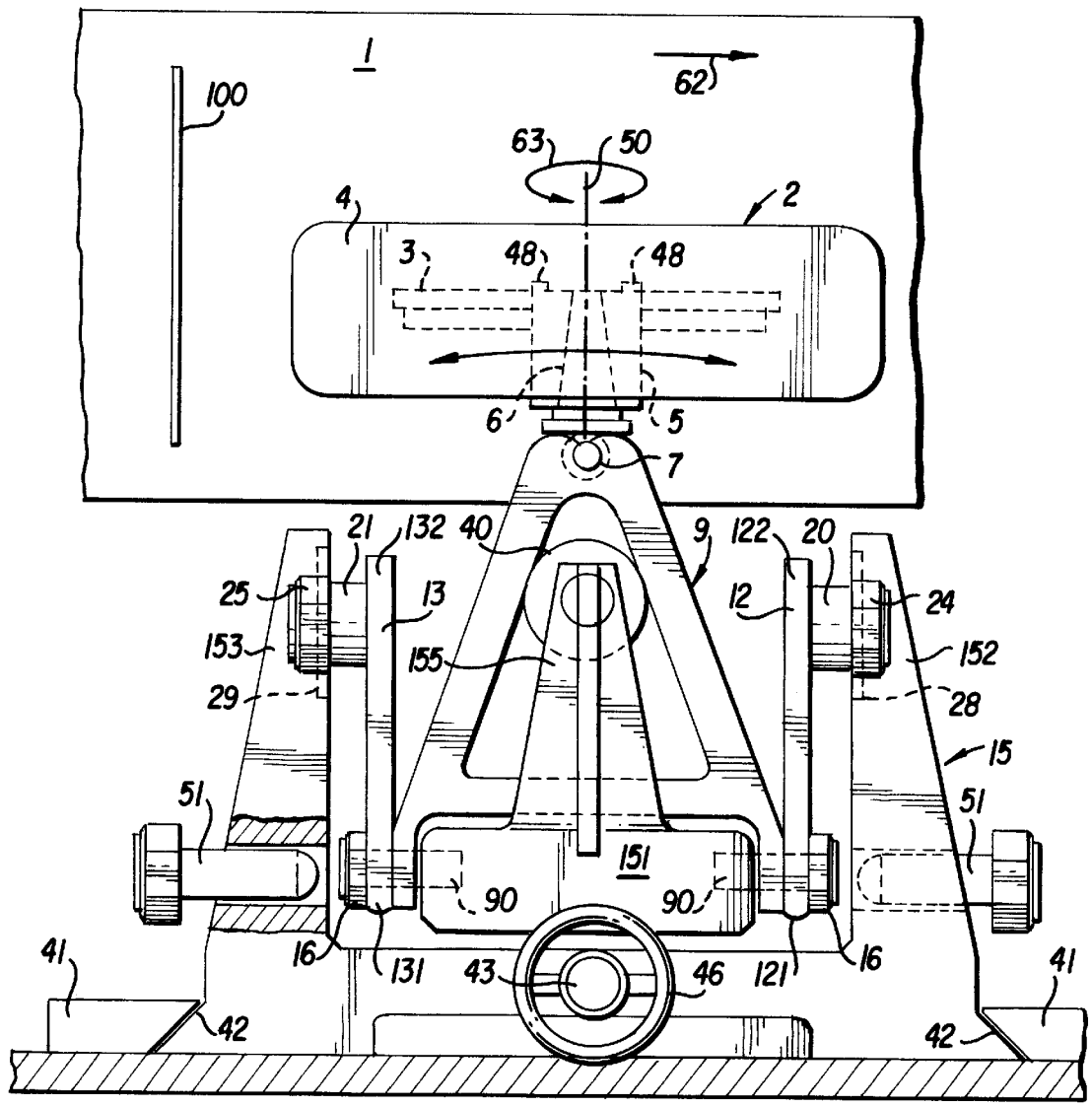
FIG. 3 is a rear view of the apparatus of FIG. 1, but also showing the road-wheel.
Figure 4:
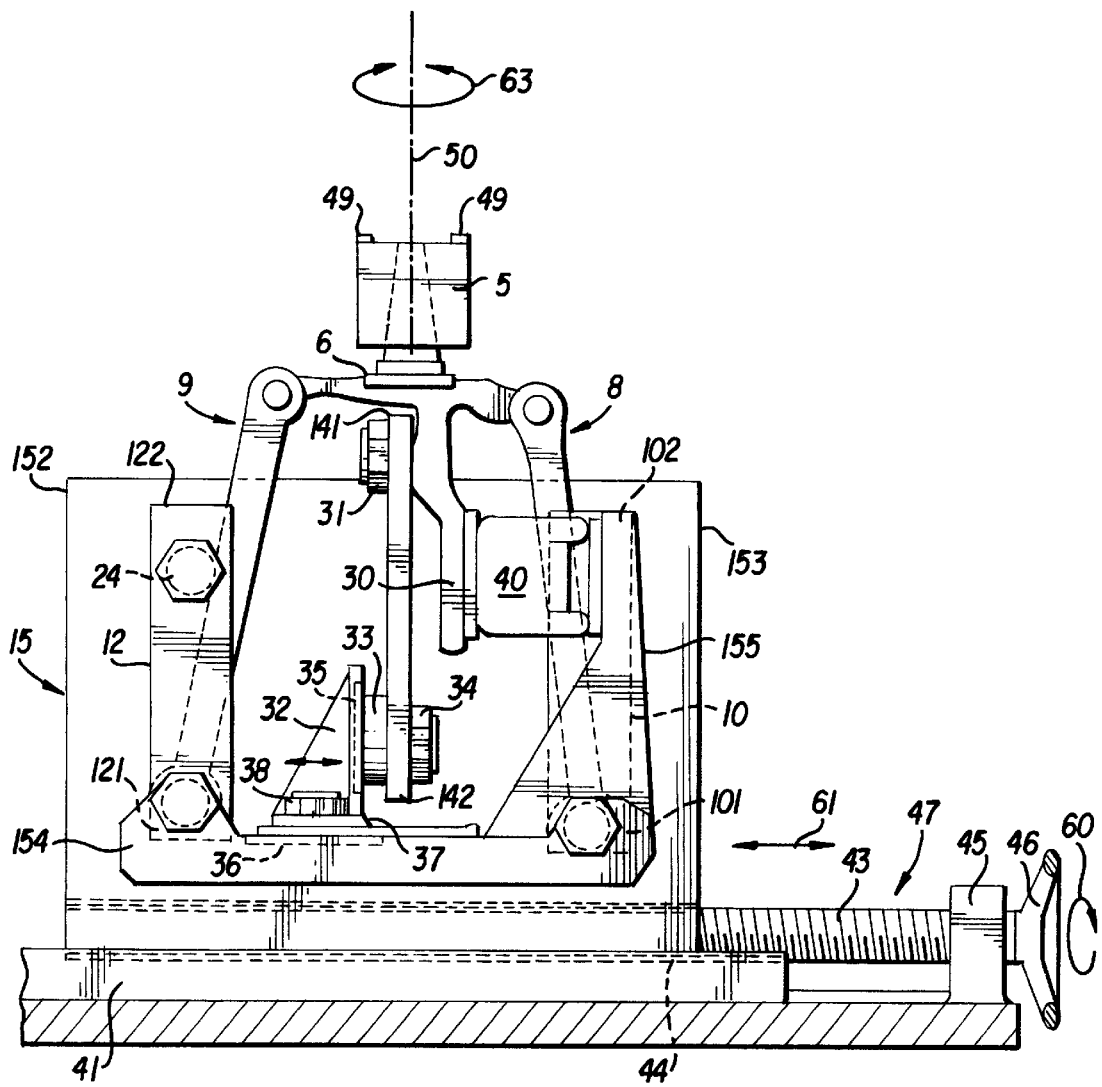
FIG. 4 is a side view of the apparatus of FIG. 1.

There is shown in FIGS. 1, 2, 3 and 4 an apparatus for a test of passing over an obstacle of a wheel, made according to the invention. The apparatus comprises a road-wheel 1 (see FIGS. 2 and 3) provided with a relief 100 of a preselected shape, forming an obstacle. A wheel 2, comprising a rim 3 and a tire 4, is fastened to a hub 5, rotatably supported by a steering knuckle 6, so that its tire 4 remains in contact with the road-wheel 1. The road-wheel 1 rotates thanks to an electric motor, not shown, and causes the tire 4 to rotate. The steering knuckle 6 is connected by means of pins 7 to two superimposed suspension arms 8 and 9, substantially triangular that form a quadrilateral suspension. The suspension arms 8 and 9 are supported by sleeves 150 and 151 in a supporting frame 15 by means of pins 80 and 90. Four leaf springs 10, 11, 12 and 13 connect the arms 8 and 9 to the supporting frame 15. The leaf springs 10, 11, 12 and 13 are formed by laminas substantially parallel to the sides of the suspension arms 8 and 9. The leaf springs 10, 11, 12 and 13 have one end 101, 111, 121 and 131, respectively, fastened to the arms 8 and 9 by means of threaded stems of the pins 80 and 90 and respective nuts 16. The leaf springs 10, 11, 12 and 13 have another end 102, 112, 122 and 132, respectively, connected to walls 152 and 153 of the frame 15 by means of a spacer 18, 19, 20 and 21, respectively, and an adjustable bolt 22, 23, 24 and 25, respectively. When the bolts 22, 23, 24 and 25 are loosened, their threaded stems can slide in respective slots 26, 27, 28 and 29, obtained in the walls 152 and 153 and extending in a direction orthogonal to the plane of the wheel 2, to adjust the anchoring point of the leaf springs 10, 11, 12 and 13 with respect to the frame 15. This way, it is possible to vary the stiffness K2 of the leaf springs 10, 11, 12 and 13 and, thus, the longitudinal stiffness (arrow 64) of the suspension arms 8 and 9.

The two arms 8 and 9 are the same and the respective pairs of leaf springs 10, 11 and 12, 13 are also the same and connected in the same way to the arms 8 and 9 and to the frame 15.

A leaf spring 14 is interposed between the steering knuckle 6 and the frame 15. The leaf spring 14 is formed by a lamina substantially parallel to the plane of the suspension arms 8 and 9. The spring 14 has one end 141 fastened to a support 30, integral with the steering knuckle 6, by means of a bolt 31 and has another end 142 connected to a shoe 32 by means of a spacer 33 and an adjustable bolt 34.

By loosening the bolt 34, its threaded stem can slide in a slot 35 obtained in the shoe 32 and extending in a direction orthogonal to the plane of the wheel 2 to adjust the point of anchoring of the leaf spring 14 with respect to the frame 15. This way, it is possible to vary the stiffness K1 of the leaf spring 14 and, thus, the radial stiffness of the suspension arms 8 and 9.

The shoe 32 is fitted in a slot 36 obtained in a wall 154 of the frame 15 and extending parallel to the plane of the wheel 2 by means of a spacer 37 and an adjustable bolt 38. When the bolt 38 is loosened, its threaded stem can slide in the slot 36 in a radial direction (arrow 65) so as to align the leaf spring 14 with the axis of rotation 50 of the wheel 2.

A pneumatic spring 40 is interposed between the support 30 and a wall 155 of the frame 15. The spring 40 can be adjusted and is used to give an initial radial preload to the tire 4 of a value equivalent to a share of weight of a vehicle that bears upon the wheel.

The frame 15 is slidably supported in a base 41 by means of swallow-tailed slide guides 42 extending in a radial direction. The frame 15 is driven to slide along the guides 42 by a forward actuator 47 comprising a forward shaft 43, provided with a worm thread, that engages with a corresponding threaded hole 44 of the frame 15. The shaft 43 is rotatably supported in a bracket 45 that prevents its axial translations and is driven to rotate by means of a driving handwheel 46 (arrow 60). While the shaft 43 rotates, the frame 15 slides in a radial direction to adjust the position of the wheel 2 with respect to the road-wheel 1. It is thus possible to move the tire 4 toward the road-wheel 1 and away from it (double arrow 61) in order to carry out the removal of the tire and to move it up against the road wheel before giving the radial preload with the pneumatic spring 40.

To the hub 3 of the wheel 2 there are fastened two radial and longitudinal acceleration transducers 48 and 49, consisting of linear accelerometers. The accelerometers 48 measure the accelerations in a longitudinal direction (parallel to the peripheral velocity vector of the tire), the accelerometers 49 measure the accelerations in a radial direction (perpendicular to the axis of rotation of the road wheel and of the wheel with the tire).

The frame 15 is provided with four bolts 51 that are used to clamp the ends 101, 111, 121 and 131 of the leaf springs 10, 11, 12 and 13, fastening the arms 8 and 9 with respect to the frame 15 in a longitudinal direction. This allows to obtain the condition of a hub fixed in the longitudinal direction. When the length of the leaf spring 14 is shortened to its maximum extent it is possible to have a high stiffness of the suspension in the radial direction so as to obtain the condition of a hub fixed in that direction as well.

During the movable-hub test of passing over an obstacle, the road-wheel 1 drives the wheel 2 to rotate (arrow 62, see FIGS. 2 and 3) and the obstacle 100, depending the forward speed of the wheel 2, excites the natural motions of the tire 4 that starts to vibrate with its natural frequencies, oscillating on the axis 50 (double arrow 63). The vibrations of the tire 4 are dampened after a more or less short time and at the hub 3, by means of accelerometers 48 and 49 the signals are detected, variable over time, of the longitudinal and vertical forces. These signals are depending on the excitation given by the obstacle, on the forward speed of the wheel and on the natural frequencies of the tire in the plane of the wheel.

The dampened free oscillations of the tire are analyzed at different forward speeds and six natural motions of the tire are highlighted, in a field of frequencies ranging from 0 Hz to 130 Hz. These natural motions are translated into six experimental curves of the natural frequencies and of the corresponding dampenings with the forward speed.

We claim:

1. An apparatus for testing a test wheel comprising a rim and a tire rotating at preselected speed over an obstacle, said apparatus comprising a road-wheel, means for rotating said road wheel at preselected speeds, said obstacle protruding from and supported on said road wheel, a hub which is fastenable to the rim of the test wheel, a steering knuckle capable of rotatably supporting said hub and the test wheel, said hub being positionable relative to said road-wheel to position the tire to contact, and rotate with, the road-wheel during testing of the test wheel, first and second acceleration transducer means associated with said hub for measuring natural frequencies and dampenings of said tire in a radial direction and in a longitudinal direction, a supporting frame, two suspension arms for supporting said steering knuckle, a first, second, third and fourth leaf spring having respective first ends fastened to a respective suspension arm and respective second ends connected to said supporting frame, first, second, third and fourth respectively adjustable fasteners capable of varying the length of each leaf spring to adjust its stiffness and to change the longitudinal stiffness of said suspension arms, a fifth leaf spring, a shoe, a fifth adjustable fastener, said fifth leaf spring having a first end fastened to said steering knuckle and a second end connected to said shoe by means of said fifth adjustable fastener, said fifth adjustable fastener capable of varying the length of said fifth leaf spring to adjust its stiffness and to change the radial stiffness of said suspension arms, and a pneumatic spring in engagement with said steering knuckle and with said supporting frame, said pneumatic spring being capable of giving an initial radial preload to the tire, said preload being equivalent to a share of weight of a vehicle that would bear upon the test wheel if the test wheel were employed with the vehicle.

2. An apparatus according to claim 1, comprising clamping elements capable of being engaged with said first ends of said first, second, third and fourth leaf springs to clamp said suspension arms in a longitudinal direction, said fifth leaf spring being shortenable to clamp said suspension arms in a radial direction relative to said road-wheel to fix the position of the hub.

3. An apparatus according to claim 1, wherein said shoe is mounted in said supporting frame in a manner slidable in a radial direction relative to said road-wheel to position said fifth leaf spring coaxial with said test wheel, further comprising a sixth adjustable fastener being associated with said shoe to fasten said shoe to said supporting frame.

4. An apparatus according to claim 1, comprising a base, wherein said supporting frame is slidably supported in said base by means of sliding guides aligned in a radial direction relative to said road-wheel and is in engagement with a forward actuator capable of changing the position of said supporting frame in said radial direction and of adjusting the position of said test wheel with respect to said road-wheel.

5. An apparatus according to claim 1, wherein said obstacle is an inert relief having a predetermined shape.

6. An apparatus according to claim 1, wherein the means for rotating said road-wheel comprises an electric motor.

7. The apparatus according to claim 1, wherein said road-wheel provides a means for rotating said test wheel.

8. The apparatus according to claim 1, wherein said fifth leaf spring is located between said suspension arms and between said knuckle and said frame.

9. The apparatus of claim 8, wherein said shoe defines a slot extending in a direction orthogonal to the plane of the test wheel to adjust functional attachment of the fifth leaf spring to the frame.

10. The apparatus of claim 3, wherein said shoe is fitted in a slot, defined by the frame and extending parallel to the plane of the test wheel, by means of a spacer and said sixth adjustable fastener.

11. The apparatus of claim 4, wherein said frame is slidably supported in said base by swallow-tailed slide glides extending in said radial direction, and a forward actuator comprising a threaded shaft which engages a threaded hole defined by said frame.

12. The apparatus according to claim 1, wherein the suspension arms are substantially triangular.

13. The apparatus according to claim 1, wherein said hub is configured to hold the test wheel such that the plane of the test wheel is vertical.

14. The apparatus of claim 13, wherein the pneumatic spring exerts a vertical force against said knuckle.

* * * * *